Patented May 23, 1950

2,508,376

UNITED STATES PATENT OFFICE 2,508,376

MANUFACTURE OF BIGUANIDE DERIVATIVES

Albert Frederick Crowther, Francis Henry Swinden Curd, and Francis Leslie Rose, Blackley, Manchester, England, assignors to Imperial Chemical Industries Limited, a corporation of Great Britain No Drawing. Application January 22, 1948, Serial No. 3,816. In Great Britain February 1, 1947

4 Claims. (Cl. 260—565)

This invention relates to the manufacture of biguanide derivatives and more particularly it relates to the manufacture of biguanide derivatives which have antimalarial properties.

According to the invention we manufacture biguanide derivatives which have antimalarial properties by a process which comprises subjecting to the action of halogenating agents a substance of the formula

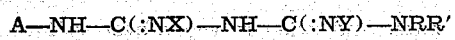

wherein A represents a benzene nucleus which may optionally bear a halogen, lower alkyl or lower alkoxy substituent or substituents in position meta to the —NH— group, wherein X and Y represent hydrogen or lower alkyl radicals provided both be not lower alkyl radicals at the same time, wherein R represents a lower alkyl radical, R' represents hydrogen or a lower alkyl radical, and wherein R and R' together contain more than one and fewer than eight carbon atoms.

As substances of the stated formula there may be used for example $N^1$-phenyl-$N^5$-isopropylbiguanide (M. P. of monohydrochloride 235–6° C.), $N^1$-phenyl-$N^5$-methyl-$N^5$-isopropylbiguanide (M. P. of monohydrochloride 212° C.), $N^1$-phenyl-$N^5$:$N^5$-diethylbiguanide (M. P. 100–101° C.), $N^1$-m-chlorophenyl-$N^5$-isopropylbiguanide (M. P. of monohydrochloride 232° C.), $N^1$-m-chlorophenyl-$N^5$-n-propylbiguanide (M. P. of monohydrochloride 194–5° C.), $N^1$-m-chlorophenyl-$N^5$-ethylbiguanide (M. P. of monohydrochloride 210–211° C.), $N^1$-m-chlorophenyl-$N^5$:$N^5$-diethylbiguanide (M. P. of monohydrochloride 227° C.), $N^1$-3:5-dichlorophenyl-$N^5$-isopropylbiguanide (M. P. of monohydrochloride 239–240° C.), $N^1$-m-bromophenyl-$N^5$-isopropylbiguanide (M. P. of monohydrochloride 225° C.), $N^1$-m-bromophenyl-$N^5$-n-propylbiguanide (M. P. of monohydrochloride 194–5° C.), $N^1$-m-bromophenyl-$N^5$-ethylbiguanide (M. P. of monohydrochloride 216–7° C.), $N^1$-m-methylphenyl-$N^5$-isopropylbiguanide (M. P. of monohydrochloride 216° C.), $N^1$-m-chlorophenyl-$N^2$-methyl-$N^5$-isopropylbiguanide (M. P. of monohydrochloride 137–8° C.) and $N^1$-m-methoxyphenyl-$N^5$-isopropylbiguanide (M. P. of monohydrochloride 212–13° C.).

These starting materials may be obtained, in the case where there is no substituent on $N^2$ or $N^4$, i. e. where X and Y are both hydrogen, for example by the process described in British Patent No. 577,843, viz., by interaction of the appropriate alkyl or dialkylamine with an appropriately substituted aryldicyandiamide. In the case where $N^2$ or $N^4$ bear alkyl substituents the starting materials may be made for example by the process described in co-pending application Serial No. 720,096, now abandoned, of Birtwell et al., filed January 3, 1947, viz. by interaction of an appropriate amino-compound with an appropriate guanylthiourea or S - alkylguanylisothiourea. The compounds where X and Y are both hydrogen may of course also be made by this process.

Equally the products of the process of this invention may also, where X and Y are both hydrogen, be made, for example, by the processes of British Patent No. 577,843, or, where X or Y is a lower alkyl radical, for example by the process of co-pending application Serial No. 720,096, now abandoned, of Birtwell et al. filed January 3, 1947. The present process provides an easy and convenient way of making the para-halogen substituted biguanides from those which are unsubstituted in that position. The process of British specification No. 577,843 requires as ultimate starting material a halogenated arylamine which in many cases may be difficult of access. In these cases it may be more convenient to build up the biguanide molecule and then finally halogenate as in the process of the present invention. Halogenation, according to the process of the invention, of unsubstituted or meta-substituted phenylbiguanides results in para-substitution and in little or no substitution in the ortho-position. Moreover the phenylbiguanides bearing ortho-halogen substituents are relatively little active as antimalarials. In some cases where there is formed simultaneously a small proportion of the less active ortho-substitution product this may be difficult to separate from the desired highly active, para-substituted product. However the presence of a small proportion of an inactive, harmless substance is no serious detriment to the use of the product as an antimalarial agent.

It is surprising that the halogenation process of this invention can be carried out smoothly and leading to the para-halogen substituted product in good yield. It would have been expected that treatment with halogenating agents would have brought about substantial degradation of the highly reactive biguanide structure.

As halogenating agents there may be used the halogens themselves, as for example chlorine or bromine, or there may be used other halogenating agents, as for example iodine monochloride.

The process may conveniently be carried out in a liquid medium, advisedly one which is a solvent for the reactants. As suitable liquid media which may be used there are for example acetic acid, nitrobenzene, concentrated sulphuric acid.

The invention is illustrated but not limited by the following examples in which the parts are by weight.

Example 1

2.56 parts of $N^1$-phenyl-$N^5$-isopropylbiguanide hydrochloride are dissolved in water, the solution is made alkaline by addition of sodium hydroxide, and is then extracted with benzene. The benzene extract is dried with anhydrous potassium carbonate, filtered and evaporated to dryness. The $N^1$-phenyl-$N^5$-isopropylbiguanide, so obtained, is dissolved in 10 parts of glacial acetic acid and chlorine gas is passed into the solution at 0–10° C. until 0.71 part of chlorine has been absorbed. The reaction mixture is then allowed to stand at room temperature for one hour and is diluted with 40 parts of water, clarified with decolourising carbon and poured into an excess of a 20% aqueous sodium hydroxide solution. The precipitated solid is separated and dissolved in 30 parts of 7% hydrochloric acid. The solution is made just alkaline to Brilliant Yellow and the crystalline solid which separates is filtered off and recrystallised from water. There is thus obtained $N^1$-p-chlorophenyl-$N^5$-isopropylbiguanide hydrochloride, M. P. 236° C. $N^1$-p-chlorophenyl-$N^5$-isopropylbiguanide acetate, M. P. 183–183.5° C., is obtained when the hydrochloride is converted to the base which is then dissolved in dry ethyl acetate and treated with glacial acetic acid.

By the process described in this example, using an appropriate starting material, there may also be made $N^1$-p-chlorophenyl-$N^5$-ethylbiguanide (M. P. 113–114° C., M. P. of acetate 160–161° C.) and $N^1$-p-chlorophenyl-$N^5$-n-propylbiguanide (M. P. 58.5–60° C., M. P. of acetate 164–165° C.).

Example 2

The base obtained from 2.56 parts of $N^1$-phenyl-$N^5$-isopropylbiguanide hydrochloride is dissolved in 36 parts of 98% sulphuric acid and the solution is stirred at room temperature for 16 hours with 1.6 parts of bromine. The product is poured into 100 parts of water and the mixture is clarified with decolourising carbon and poured into an excess of 40% aqeous sodium hydroxide solution. The solid which separates is filtered off, washed with water, dissolved in 50 parts of 7% hydrochloric acid and filtered. The filtrate is made just alkaline to Brilliant Yellow by addition of aqueous ammonia. The solid which separates is filtered off, washed with water, dried and crystallised from a mixture of ethanol and ethyl acetate. The crystals so formed consist of $N^1$-p-bromophenyl-$N^5$-isopropylbiguanide hydrochloride and have M. P. 241° C.

By the process described in this example, using an appropriate starting material, there may also be obtained $N^1$-p-bromophenyl-$N^5$-n-propylbiguanide (M. P. of monohydrochloride 221–222° C.) and $N^1$-p-bromophenyl-$N^5$-ethylbiguanide (M. P. of monohydrochloride 233–234° C.).

Example 3

1.28 parts of $N^1$-phenyl-$N^5$-isopropylbiguanide hydrochloride are converted to the base and the base is dissolved in 8 parts of glacial acetic acid. A solution of 0.89 part of iodine monochloride in 2.6 parts of glacial acetic acid is added and the mixture is heated at 100° C. for 8 hours. The reaction mixture is poured into 50 parts of water and the mixture is extracted with benzene. The aqueous layer after extraction is poured into an excess of 40% sodium hydroxide solution and the oil which separates is extracted with benzene. The benzene solution is shaken with 25 parts of 7% hydrochloric acid in 3 portions and the aqueous portions are combined, clarified and made just alkaline to Brilliant Yellow by addition of aqueous ammonia. The precipitated solid is filtered off, washed with water and crystallised from water giving small, colourless needles which consists of $N^1$-p-iodophenyl-$N^5$-isopropylbiguanide hydrochloride and have M. P. 236° C.

By the process described in this example, using an appropriate starting material, there may also be made $N^1$-p-iodophenyl-$N^5$-n-propylbiguanide (M. P. of monohydrochloride 222–224° C.), and $N^1$-p-iodophenyl-$N^5$-ethylbiguanide (M. P. of monohydrochloride 239–240° C.).

Example 4

The base obtained from 2.5 parts of $N^1$-phenyl-$N^5$-methyl-$N^5$-isopropylbiguanide hydrochloride is dissolved in 10 parts of glacial acetic acid and chlorine gas is passed into the solution at 20° C. until 0.65 part of chlorine has been absorbed. The mixture is allowed to stand at 20° C. for one hour and is then diluted with 30 parts of water, clarified and poured into an excess of ice cold 40% sodium hydroxide solution. The solid which is precipitated is filtered off, washed with water and dried in vacuo over sodium hydroxide. The dry base is treated with 0.55 part of glacial acetic acid and the mixture is diluted with ethyl acetate. The solid is filtered off and crystallised from a mixture of methanol and ethyl acetate to give $N^1$-p-chlorophenyl-$N^5$-methyl-$N^5$-isopropylbiguanide acetate, of M. P. 215° C.

By the process described in this example, using an appropriate starting material, there may also be made $N^1$-p-chlorophenyl-$N^5$-methyl-$N^5$-n-propylbiguanide (M. P. 125–126° C.) and $N^1$-p-chlorophenyl-$N^5$:$N^5$-diethylbiguanide (M. P. 133–134° C.).

Example 5

The base obtained from 1.35 parts of $N^1$-phenyl-$N^5$-methyl-$N^5$-isopropylbiguanide hydrochloride is dissolved in 5 parts of glacial acetic acid and is treated with 0.8 part of bromine dissolved in 4 parts of glacial acetic acid. The mixture is allowed to stand at room temperature for 1 hour and then diluted with 20 parts of water and made strongly alkaline by addition of sodium hydroxide. The solid matter is filtered off, washed with a little water and dissolved in 10 parts of 7% hydrochloric acid. The solution is clarified and made just alkaline to Brilliant Yellow by addition of aqueous ammonia. The solid which separates is filtered off, washed with water and crystallised from water. Colourless needles of $N^1$-p-bromophenyl-$N^5$-methyl-$N^5$-isopropylbiguanide hydrochloride, with M. P. 243° C., are thus obtained.

By the process described in this example, using an appropriate starting material, there may also be made $N^1$-p-bromophenyl-$N^5$-methyl-$N^5$-n-propylbiguanide (M. P. of monohydrochloride 237° C.) and $N^1$-p-bromophenyl-$N^5$:$N^5$-diethylbiguanide (M. P. 140–141° C.).

Example 6

1.35 parts of $N^1$-phenyl-$N^5$-methyl-$N^5$-isopropylbiguanide hydrochloride are converted to the base, the base is dissolved in 7 parts of glacial acetic acid and there is added a solution of 0.8 part of iodine monochloride in 2.3 parts of glacial acetic acid. The mixture is heated at 100° C. for 8 hours. It is then treated in exactly the same manner as is the reaction mixture of Example 3 and there are obtained colourless needles from water of $N^1$-p-iodophenyl-$N^5$-methyl-$N^5$-isopropylbiguanide hydrochloride, M. P. 236–237° C.

By the process described in this example, using an appropriate starting material, there may be also obtained $N^1$-p-iodophenyl-$N^5$-methyl-$N^5$-n-propylbiguanide (M. P. of monohydrochloride 238° C.).

Example 7

1.27 parts of $N^1$-phenyl-$N^5$-isopropylbiguanide hydrochloride are dissolved in 10 parts of glacial acetic acid and chlorine gas is passed into the solution until 0.37 part of chlorine has been absorbed. The mixture is allowed to stand at atmospheric temperature for one hour. It is then treated as is described in Example 3 and there are obtained colourless crystals from water of $N^1$-p-chlorophenyl-$N^5$-isopropylbiguanide hydrochloride, M. P. 236° C.

Example 8

17.73 parts of $N^1$-m-chlorophenyl-$N^5$-isopropyl-biguanide are dissolved in 110 parts of glacial acetic acid. To this solution, cooled and agitated, are added 58 parts of glacial acetic acid containing 5.0 parts of chlorine. The mixture is allowed to warm to atmospheric temperature and is then allowed to stand for 17 hours. It is then treated as is described in Example 3 and after repeated crystallisation from water there are obtained colourless crystals of $N^1$-3:4-dichlorophenyl-$N^5$-isopropylbiguanide hydrochloride, M. P. 239° C.

By the process described in this example, using an appropriate starting material, there may also be obtained $N^1$-3:4-dichlorophenyl-$N^5$-n-propylbiguanide (M. P. of monohydrochloride 237–8° C.), $N^1$-3:4-dichlorophenyl-$N^5$-methyl-$N^5$-isopropylbiguanide (M. P. of monohydrochloride, 251–2° C.), $N^1$-3:4-dichlorophenyl-$N^5$-methyl-$N^5$-n-propylbiguanide (M. P. of monohydrochloride, 236° C.), $N^1$-3:4-dichlorophenyl-$N^5$-ethylbiguanide (M. P. of monohydrochloride 216° C.), $N^1$-3:4-dichlorophenyl-$N^5$:$N^5$-diethylbiguanide (M. P. of monohydrochloride 231° C.), $N^1$-3:4:5-trichlorophenyl-$N^5$-isopropylbiguanide (M. P. of monohydrochloride 254–5° C.), $N^1$-3:4:5-trichlorophenyl-$N^5$-n-propylbiguanide (M. P. of monohydrochloride 228–9° C.) and $N^1$-3:4:5-trichlorophenyl-$N^5$-methyl-$N^5$-isopropylbiguanide (M. P. of monohydrochloride 234–235° C.).

Example 9

As described in Example 8 but using 10.6 parts of bromine in place of the chlorine of Example 8 there is obtained a colourless crystalline product which consists substantially of $N^1$-3-chloro-4-bromophenyl-$N^5$-isopropylbiguanide hydrochloride.

By a similar process, using an appropriate starting material, there may also be obtained $N^1$-3-chloro-4-bromophenyl-$N^5$-ethylbiguanide (M. P. of monohydrochloride 217° C.), $N^1$-3-chloro-4-bromophenyl-$N^5$-n-propylbiguanide (M. P. of monohydrochloride 217° C.), $N^1$-3-chloro-4-bromophenyl-$N^5$-methyl-$N^5$-isopropylbiguanide (M. P. of monohydrochloride 244° C.) and $N^1$-3-chloro-4-bromophenyl-$N^5$-methyl-$N^5$-n-propylbiguanide (M. P. of monohydrochloride 234° C.).

Example 10

5.88 parts of $N^1$-m-chlorophenyl-$N^5$-isopropylbiguanide hydrochloride are converted to the free base, and this base is dissolved in 30 parts of glacial acetic acid. A solution of 3.6 parts of iodine monochloride in 14 parts of glacial acetic acid is added and the mixture is heated at 100° C. for 17 hours. It is then treated as is described in Example 3. There are thus obtained colourless crystals, from water, of $N^1$-3-chloro-4-iodophenyl-$N^5$-isopropylbiguanide hydrochloride, M. P. 221–222° C.

By the process described in this example, using an appropriate starting material there may also be obtained $N^1$-3-chloro-4-iodophenyl-$N^5$-n-propylbiguanide (M. P. of monohydrochloride 225° C.), $N^1$-3-chloro-4-iodophenyl-$N^5$-methyl-$N^5$-isopropylbiguanide (M. P. of monohydrochloride 231° C.), $N^1$-3-chloro-4-iodophenyl-$N^5$-methyl-$N^5$-n-propylbiguanide (M. P. of monohydrochloride 229–230° C.) and $N^1$-3-chloro-4-iodophenyl-$N^5$-ethylbiguanide (M. P. of monohydrochloride 226–227° C.).

Example 11

6.69 parts of $N^1$-m-bromophenyl-$N^5$-isopropylbiguanide hydrochloride are dissolved in 70 parts of glacial acetic acid. Chlorine gas is passed into the mixture at room temperature until 1.42 parts of chlorine have been absorbed. The mixture is allowed to stand for 20 hours at atmospheric temperature and is then treated as is described in Example 5. There is thus obtained a colourless crystalline product which consists substantially of $N^1$-4-chloro-3-bromophenyl-$N^5$-isopropylbiguanide.

By the process described in this example, using an appropriate starting material, there may also be obtained $N^1$-4-chloro-3-bromophenyl-$N^5$-n-propylbiguanide (M. P. of monohydrochloride 197–8° C.), $N^1$-4-chloro-3-bromophenyl-$N^5$-ethylbiguanide (M. P. of monohydrochloride 215–6° C.), $N^1$-4-chloro-3-bromophenyl-$N^5$-methyl-$N^5$-isopropylbiguanide (M. P. of monohydrochloride 240–241° C.) and $N^1$-4-chloro-3-bromophenyl-$N^5$-methyl-$N^5$-n-propylbiguanide (M. P. of monohydrochloride 232–232.5° C.).

Example 12

4.33 parts of $N^1$-m-bromophenyl-$N^5$-isopropylbiguanide are dissolved in 33 parts of glacial acetic acid and there is added, with cooling, a solution of 2.32 parts of bromine in 13.8 parts of glacial acetic acid. The mixture is allowed to stand at atmospheric temperature for 24 hours. It is then treated as is described in Example 3. There are thus obtained colourless prisms which consist substantially of $N^1$-3:4-dibromophenyl-$N^5$-isopropylbiguanide hydrochloride.

By the process described in this example, using an appropriate starting material, there may also be obtained $N^1$-3:4-dibromophenyl-$N^5$-n-propylbiguanide (M. P. of monohydrochloride 217.5–219° C.), $N^1$-3:4-dibromophenyl-$N^5$-ethylbiguanide (M. P. of monohydrochloride 213–214° C.), $N^1$-3:4-dibromophenyl-$N^5$-methyl-$N^5$-isopropylbiguanide (M. P. of monohydrochloride 234–235° C.), and $N^1$-3:4-dibromophenyl-$N^5$-methyl-$N^5$-n-propylbiguanide (M. P. of monohydrochloride 234–235° C.).

Example 13

The base obtained from 3.4 parts of $N^1$-m-bromophenyl-$N^5$-isopropylbiguanide hydrochloride is dissolved in 13 parts of glacial acid and there is added a solution of 1.62 parts of iodine monochloride in 5 parts of glacial acetic acid. The mixture is heated at 100° C. for 46 hours and is then treated as is described in Example 3. There are thus obtained colourless crystals which consist substantially of $N^1$-3-bromo-4-iodophenyl-$N^5$-isopropylbiguanide hydrochloride.

By the process described in this example, using an appropriate starting material, there may also be obtained $N^1$-3-bromo-4-iodophenyl-$N^5$-methyl-$N^5$-isopropylbiguanide (M. P. of monohydrochloride 232–233° C.), $N^1$-3-bromo-4-iodophenyl-$N^5$-methyl-$N^5$-n-propylbiguanide (M. P. of monohydrochloride 228–9° C.), $N^1$-3-bromo-4-iodophenyl-$N^5$-n-propylbiguanide (M. P. of monohydrochloride 227–8° C.), $N^1$-3-bromo-4-iodophenyl-$N^5$-ethylbiguanide (M. P. of monohydrochloride 220–1° C.).

*Example 14*

6.49 parts of $N^1$-3:5-dichlorophenyl-$N^5$-isopropylbiguanide hydrochloride are dissolved in 40 parts of glacial acetic acid and there is added a solution of 3.36 parts of bromine in 15 parts of glacial acetic acid. The mixture is heated at 60° C. for 5 hours and is then allowed to stand at atmospheric temperature for 16 hours. It is then treated as is described in Example 5. There are thus obtained colourless needles from water of $N^1$-3:5-dichloro-4-bromophenyl-$N^5$-isopropylbiguanide hydrochloride, M. P. 244–5° C.

*Example 15*

A solution of 10 parts of $N^1$-m-tolyl-$N^5$-isopropylbiguanide hydrochloride in 75 parts of glacial acetic acid is cooled to 10° C. and a stream of chlorine gas is passed through the solution until 2.79 parts of chlorine have been absorbed. The mixture is allowed to warm to atmospheric temperature during 2 hours and is then poured into a mixture of 150 parts of 40% aqueous sodium hydroxide solution and 1000 parts of water. The precipitated solid is filtered off, washed with water and dried. Crystallisation first from a mixture of benzene and petroleum ether (B. P. 80–100° C.) and then repeated crystallisation from petroleum ether (B. P. 80–100° C.) gives $N^1$-4-chloro-3-methylphenyl-$N^5$-isopropylbiguanide, M. P. 133–134° C.

*Example 16*

1.52 parts of $N^1$-m-chlorophenyl-$N^2$-methyl-$N^5$-isopropylbiguanide hydrochloride are dissolved in 30 parts of glacial acetic acid. 3.55 parts of chlorine gas are passed into the solution which is then allowed to stand at atmospheric temperature for 3 hours. The solution is then poured into a mixture of 50 parts of 40% aqueous sodium hydroxide solution and 100 parts of water at 5° C. The precipitated solid is filtered off, washed with water and then dissolved in 3% aqueous hydrochloric acid. The solution is filtered and then made faintly alkaline to Brilliant Yellow by addition of aqueous ammonia solution. The precipitated solid is separated and dried. It is then recrystallised from a mixture of ethanol and ethyl acetate to give $N^1$-3:4-dichlorophenyl-$N^2$-methyl-$N^5$-isopropylbiguanide hydrochloride, M. P. 165–166° C.

*Example 17*

2.59 parts of $N^1$-m-methoxyphenyl-$N^5$-isopropylbiguanide hydrochloride are dissolved in 50 parts of glacial acetic acid. The solution is cooled to 10°–15° C. and 0.71 part of chlorine gas is passed into it. The solution is allowed to stand at atmospheric temperature for 4 hours and is then poured into a cooled mixture of 80 parts of 40% aqueous sodium hydroxide solution and 100 parts of water. The precipitated solid is filtered off, washed with water, and dissolved in 20 parts of 7% aqueous hydrochloric acid. The solution is filtered and made faintly alkaline to Brilliant Yellow with aqueous ammonia solution. The solid is filtered off, washed with water and crystallised from water. There are thus obtained colourless needles of $N^1$-4-chloro-3-methoxyphenyl-$N^5$-isopropylbiguanide hydrochloride, M. P. 232–233° C.

We claim:

1. A process for the manufacture of halogen-containing biguanides which comprises subjecting a substance of the general formula:

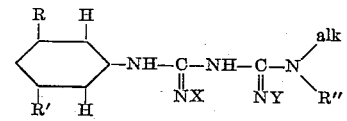

wherein R and R' represent a radical from the group consisting of hydrogen, halogen, lower alkyl and lower alkoxy; X and Y represent a radical from the group consisting of hydrogen and lower alkyl radicals with X and Y not being both lower alkyl radicals at the same time; "alk" represents a lower alkyl radical, and R" represents a radical from the group consisting of hydrogen and lower alkyl, the sum of the carbon atoms in the radicals "alk" and R" being more than one and less than eight, to the action of a halogenating agent from the group consisting of chlorine, bromine and iodine monochloride.

2. A process as claimed in claim 1, wherein said halogenating agent is chlorine and the reaction is carried out at a temperature between 0° and 20° C.

3. A process as claimed in claim 1, wherein said halogenating agent is bromine and the reaction is carried out at a temperature between room temperature and 60° C.

4. A process as claimed in claim 1, wherein said halogenating agent is iodine monochloride and the reaction is carried out at a temperature of 100° C.

ALBERT FREDERICK CROWTHER.
FRANCIS HENRY SWINDEN CURD.
FRANCIS LESLIE ROSE.

No references cited.